(12) United States Patent
Shibuya et al.

(10) Patent No.: US 8,300,778 B2
(45) Date of Patent: Oct. 30, 2012

(54) INFORMATION PROCESSING TERMINAL DEVICE AND METHOD FOR NOTIFYING MISSED CALL OR UNREAD E-MAIL

(75) Inventors: Kei Shibuya, Kawasaki (JP); Kiyotoshi Hariu, Kawasaki (JP); Takeshi Kojima, Kawasaki (JP); Rikiya Maeda, Kawasaki (JP); Masahiko Konno, Kawasaki (JP); Hayato Sasaki, Kawasaki (JP); Ken Sato, Kawasaki (JP); Tomoki Iwabuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 918 days.

(21) Appl. No.: 12/392,709

(22) Filed: Feb. 25, 2009

(65) Prior Publication Data
US 2009/0245483 A1 Oct. 1, 2009

(30) Foreign Application Priority Data

Mar. 25, 2008 (JP) .................................. 2008-78453

(51) Int. Cl.
*H04M 1/64* (2006.01)
*H04W 4/00* (2009.01)
*G08B 13/14* (2006.01)

(52) U.S. Cl. ............. 379/88.12; 340/539.17; 340/572.1; 345/83; 379/142.04; 379/373.03; 455/412.2; 455/466; 455/556.1; 455/566; 455/567

(58) Field of Classification Search ............... 340/572.1, 340/539.17; 362/552, 554, 603; 370/329, 370/335, 347; 379/88.12, 93.01, 142.04, 379/373.03; 455/412.2, 466, 556.1, 566, 455/567; 714/755; 345/83
See application file for complete search history.

(56) References Cited

U.S. PATENT DOCUMENTS

| 5,963,877 | A  | * | 10/1999 | Kobayashi ..................... 455/567 |
| 7,031,437 | B1 | * | 4/2006  | Parsons et al. ............. 379/88.12 |
| 7,046,791 | B2 | * | 5/2006  | Itoh .......................... 379/373.03 |
| 7,088,807 | B2 | * | 8/2006  | Kim .......................... 379/142.04 |
| 7,688,208 | B2 | * | 3/2010  | Schuler et al. ............. 340/572.1 |
| 7,689,234 | B2 | * | 3/2010  | Horvath et al. .............. 455/466 |
| 7,708,441 | B2 | * | 5/2010  | Luecke et al. ............... 362/552 |
| 7,834,762 | B2 | * | 11/2010 | Danvir et al. ............. 340/572.1 |

(Continued)

FOREIGN PATENT DOCUMENTS

JP 2001-177630 6/2001

(Continued)

OTHER PUBLICATIONS

English Translation of Japanese Notification of Reason(s) for Refusal issued Nov. 29, 2011 in corresponding Japanese Patent Application No. 2008-078453.

*Primary Examiner* — Gerald Gauthier
(74) *Attorney, Agent, or Firm* — Staas & Halsey LLP (57) ABSTRACT

An information processing terminal device includes a state monitoring unit that monitors whether or not there exits an unread e-mail or a missed call, a light order control unit that makes an emitting unit emit a color corresponding to each sender in a given order when the unread e-mail or the missed call is detected, where a light order control unit determines a light order of the colors according to a receiving order of the unread e-mail or an incoming order of the missed call.

9 Claims, 13 Drawing Sheets

| ADDRESS BOOK INDEX NUMBER | 0001 |
|---|---|
| NAME | A |
| TELEPHONE NUMBER | 09011111111 |
| MAIL ADDRESS | AAAAAAAA |
| LED COLOR | PINK |
| ADDRESS BOOK INDEX NUMBER | 0002 |
| NAME | B |
| TELEPHONE NUMBER | 09022222222 |
| MAIL ADDRESS | BBBBBBBB |
| LED COLOR | YELLOW |
| ADDRESS BOOK INDEX NUMBER | 0003 |
| NAME | C |
| TELEPHONE NUMBER | 09033333333 |
| MAIL ADDRESS | CCCCCCCC |
| LED COLOR | BLUE |

U.S. PATENT DOCUMENTS

| | | | |
|---|---|---|---|
| 7,853,291 B2 * | 12/2010 | Choi .......................... 455/556.1 |
| 7,924,158 B2 * | 4/2011 | Schuler et al. ............. 340/572.1 |
| 7,965,680 B2 * | 6/2011 | Jhamnani et al. ............ 370/329 |
| 7,979,775 B2 * | 7/2011 | Yu et al. ........................ 714/755 |
| 8,000,304 B2 * | 8/2011 | Armbruster et al. .......... 370/335 |
| 8,077,694 B2 * | 12/2011 | Doss et al. ................... 370/347 |
| 8,126,120 B2 * | 2/2012 | Stifelman et al. .......... 379/88.12 |
| 2004/0058714 A1 * | 3/2004 | Sawamura ................... 455/566 |
| 2004/0196151 A1 * | 10/2004 | Smith ..................... 340/539.17 |
| 2005/0018688 A1 | 1/2005 | Takeda et al. |
| 2005/0122292 A1 * | 6/2005 | Schmitz et al. ................. 345/83 |
| 2007/0243858 A1 * | 10/2007 | Marathe et al. ............ 455/412.2 |
| 2008/0192500 A1 * | 8/2008 | Kaito ............................ 362/603 |
| 2009/0190370 A1 * | 7/2009 | Luecke et al. ................. 362/554 |
| 2009/0235673 A1 * | 9/2009 | Lifson et al. ....................... 62/56 |
| 2009/0245483 A1 * | 10/2009 | Shibuya et al. ............ 379/88.12 |

FOREIGN PATENT DOCUMENTS

| | | |
|---|---|---|
| JP | 2001-308972 | 11/2001 |
| JP | 2003/071433 | 8/2003 |
| JP | 2005-166066 | 6/2005 |
| JP | 2006-238141 | 9/2006 |
| JP | 2006-295554 | 10/2006 |
| JP | 2007-300650 | 11/2007 |

* cited by examiner

| ADDRESS BOOK INDEX NUMBER | 0001 |
|---|---|
| NAME | A |
| TELEPHONE NUMBER | 09011111111 |
| MAIL ADDRESS | AAAAAAAA |
| LED COLOR | PINK |
| ADDRESS BOOK INDEX NUMBER | 0002 |
| NAME | B |
| TELEPHONE NUMBER | 09022222222 |
| MAIL ADDRESS | BBBBBBBB |
| LED COLOR | YELLOW |
| ADDRESS BOOK INDEX NUMBER | 0003 |
| NAME | C |
| TELEPHONE NUMBER | 09033333333 |
| MAIL ADDRESS | CCCCCCCC |
| LED COLOR | BLUE |

| ADDRESS BOOK INDEX NUMBER | ARRIVAL TIME | REFERENCE STATE |
|---|---|---|
| 0003 | 20:57 | UNREFERRED |
| 0002 | 20:32 | UNREFERRED |
| 0001 | 19:55 | UNREFERRED |

| ADDRESS BOOK INDEX NUMBER | RECEPTION TIME | REFERENCE STATE |
|---|---|---|
| 0003 | 21:57 | UNREFERRED |
| 0002 | 21:32 | UNREFERRED |
| 0001 | 18:33 | UNREFERRED |

INFORMATION PROCESSING TERMINAL DEVICE AND METHOD FOR NOTIFYING MISSED CALL OR UNREAD E-MAIL

CROSS-REFERENCE TO RELATED APPLICATIONS

This application is based upon and claims the benefit of priority of the prior Japanese patent application No. 2008-078453, filed on Mar. 25, 2008, the entire contents of which are incorporated herein by reference.

FIELD

The present invention relates to an information processing terminal device and a method for notifying missed call(s) or unread e-mail(s). For example, the present invention relates to an information processing terminal device that has an e-mail function and a verbal function and a method of notifying missed call(s) or unread e-mail(s). The e-mails includes for example, e-mail (may be referred to just as mail), Short Massage (may be referred to just as SMS) and chat mail.

BACKGROUND

For example, Japanese Laid-Open Patent Publications No. 2005-166066, Japanese Laid-Open Patent Publications No. 2001-308972, and Japanese Laid-Open Patent Publications No. 2001-177630 disclose an information processing terminal device that emits a color, which is set to an address book, to easily identify a caller/sender during reception of an incoming call or an e-mail. The information processing terminal device is, for example, a mobile phone or a notebook personal computer (may be referred to just as PC).

On the other hand, if the information processing terminal device has a missed call that was unable to be received or an unread mail, the missed call and the unread mail are stored in the information processing terminal device as received call history. By emitting a Light Emitting Diode (LED) with a color that is set in advance by a system, a user is notified an existence of the received call.

However, when the information processing terminal device has the missed call or the unread mail, a user is unable to confirm the caller/sender or the number of missed calls or unread mails only by emission of the system set color. To confirm the caller/sender and the number of missed calls and unread mails, the user checks a display or the like by user operation.

SUMMARY

Accordingly, it is an object in one aspect of the invention to enable a user to easily confirm information of a caller/sender and a number of missed call(s) and/or unread mail(s).

According to an aspect of the invention, an information processing terminal device includes a state monitoring unit that monitors whether or not there exists an unread e-mail or a missed call, a light order control unit that makes an emitting unit emit a color corresponding to each sender in a given order when the unread e-mail or the missed call is detected, where the light order control unit determines a light order of the colors according to a receiving order of the unread e-mail or an incoming order of the missed call.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures. Detailed description will be made of embodiments with reference to figures.

Figure 1:
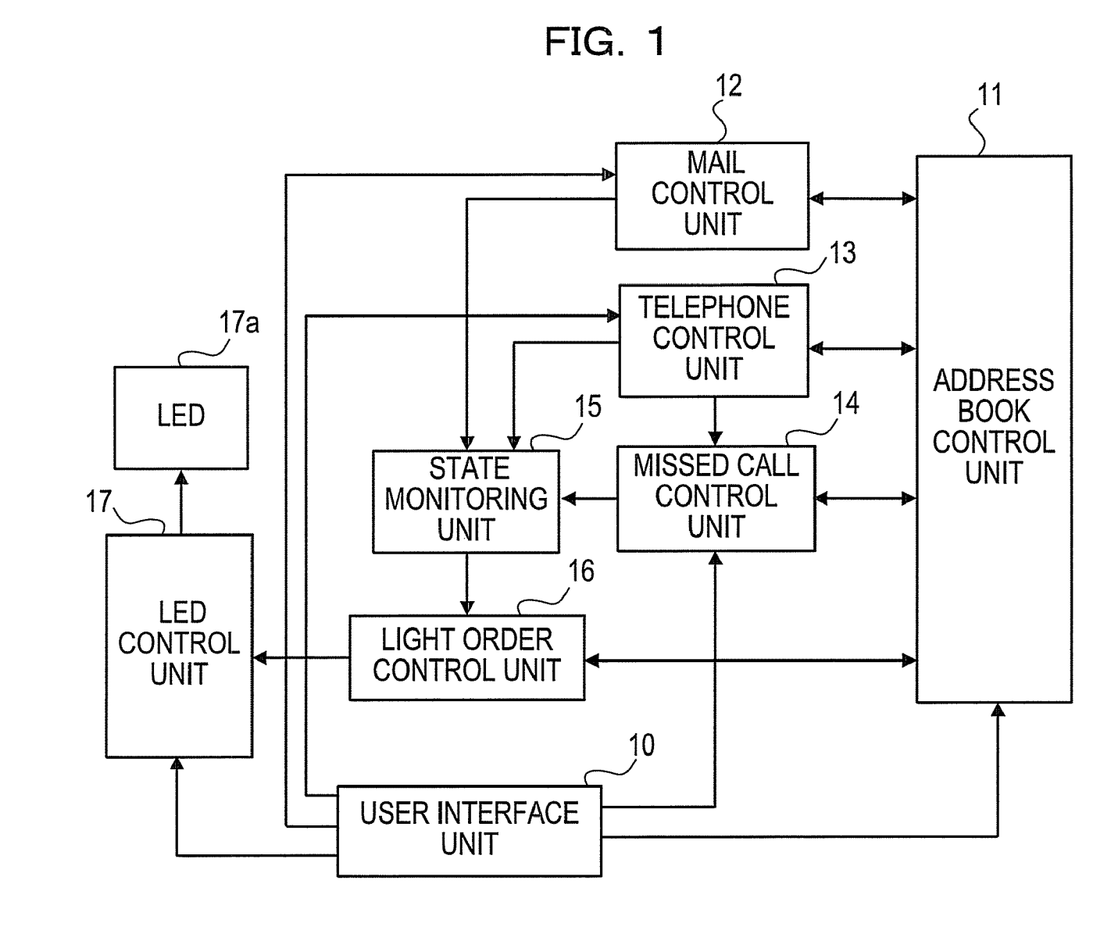
FIG. 1 is a function block diagram of a main part of an information processing terminal device according to an embodiment.

FIG. 1 is a function block diagram of a main part of an information processing terminal device according to an embodiment.

The information processing terminal device according to an embodiment has a user interface unit 10, an address book control unit 11, a mail control unit 12, a telephone control unit 13, a missed call control unit 14, a state monitoring unit 15, a light order control unit 16, an LED control unit 17.

The user interface unit 10 has a sensor or the like and inputs a command by key input from a user. Furthermore, if the information processing terminal device according to an embodiment is a foldable mobile phone or a notebook PC, for example, the user interface unit 10 detects whether the device is folded (closed) or unfolded.

The address book control unit 11 performs control of generation, update, and calling including using of the address book data stored in a memory (not shown) in response to a command from the user interface unit 10.

The mail control unit 12 controls transmission and reception of mail in response to a command from the user interface unit 10, and retrieves the address book data in cooperation with the address book control unit 11 to determine the sender. Furthermore, the mail control unit 12 manages a reference state (unread state or read state) of mail.

The telephone control unit 13 controls telephone communication in response to a command from the user interface unit 10. Furthermore, the telephone control unit 13 retrieves the address book data in cooperation with the address book control unit 11 to determine the caller.

When receiving a signal indicating occurrence of a missed call from the telephone control unit 13, the missed call control unit 14 generates and stores missed call history data based on the address book data retrieved by the address book control unit 11.

The state monitoring unit 15 monitors a state of the mail control unit 12, a state of the telephone control unit 13, and a state of the missed call control unit 14, and the state monitoring unit 15 detects (determines) whether or not an unread mail or a missed call is received.

When determining that the information processing terminal device has received an unread mail or a missed call, the light order control unit 16 refers to the address book data retrieved by the address book control unit 11, and obtains a color (hereinafter may be referred to as LED color) corresponding to each sender/caller. Then the light order control unit 16 instructs the LED control unit 17 to make an LED 17a emit the LED color corresponding to each sender/caller in a given (predetermined) order.

The LED control unit 17 controls turning-on or turning-off of the LED 17a. For example, the LED control unit 17 implements control in such a way that a plurality of LED colors are emitted in a given order determined by the light order control unit 16. The LED control unit 17 may adjust brightness of the light emitted by the LED 17a by detecting surrounding brightness by the sensor or the like of the user interface unit 10. Furthermore, the presence of the emission may be controlled according to whether or not the device is folded (closed) or unfolded.

Figure 2:
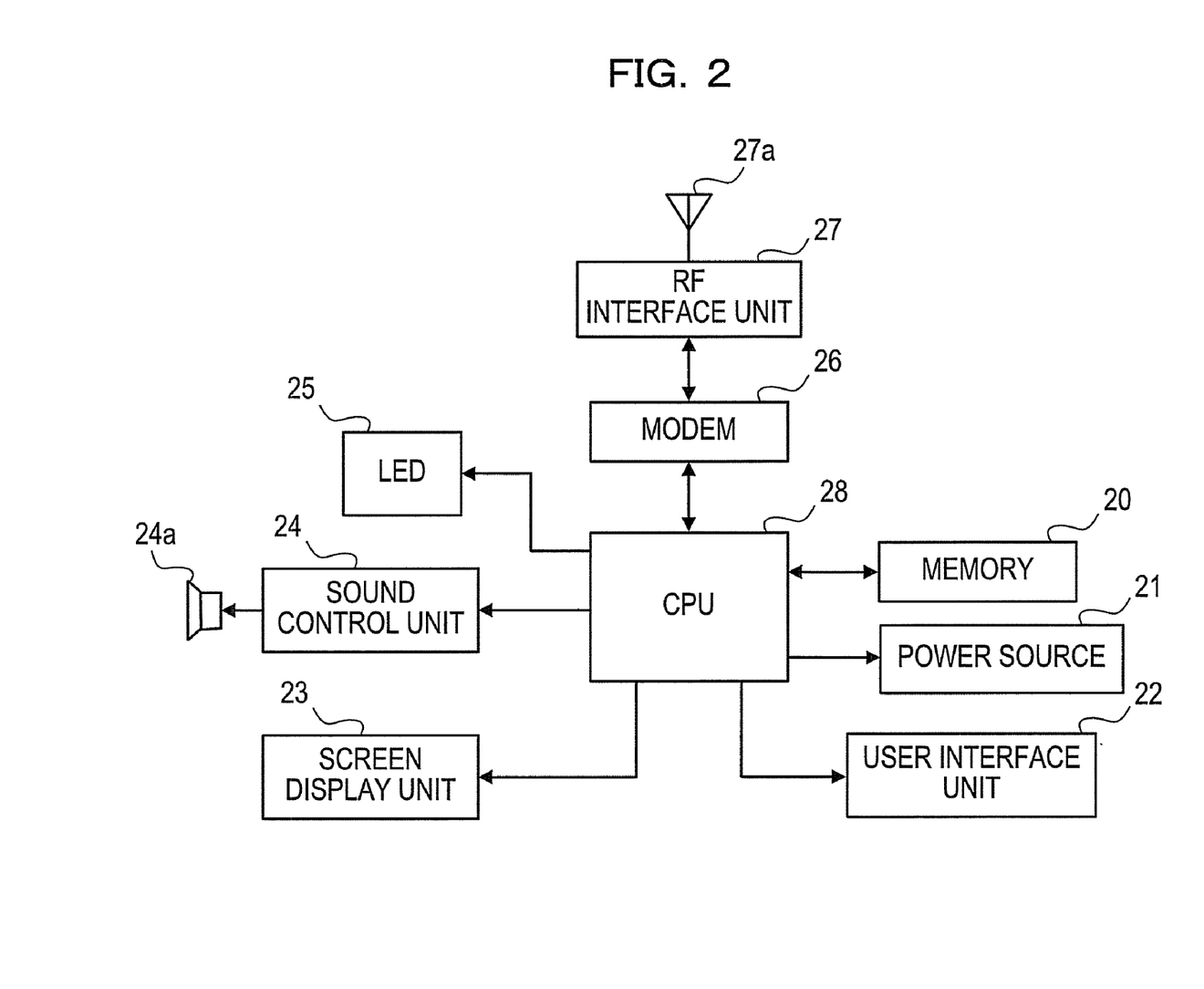
FIG. 2 is a diagram illustrating a hardware configuration example of an information processing terminal device according to an embodiment.

FIG. 2 is a diagram illustrating a hardware configuration example of an information processing terminal device according to an embodiment.

The information processing terminal device according to an embodiment may be, a mobile phone, for example, and may have a memory 20, a power source 21, a user interface unit 22, a screen display unit 23, a sound control unit 24, an LED 25, a modem 26, a Radio Frequency (RF) interface unit 27, a Central Processing Unit (CPU) 28.

The memory 20 stores various data and program(s). The memory 20 stores, for example, telephone call incoming history, mail reception history, and the like.

Figure 3:
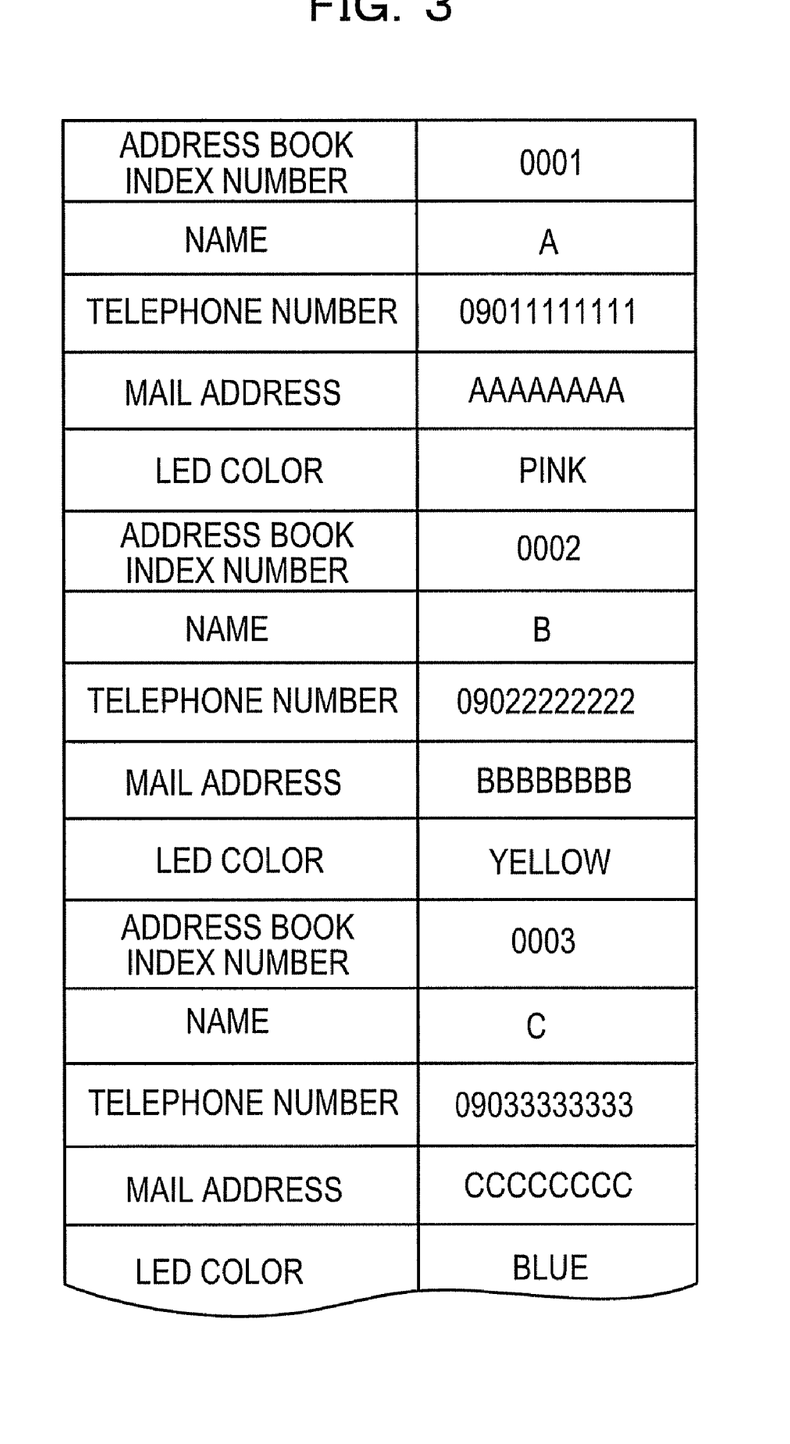
FIG. 3 is a diagram illustrating an example of address book data.

FIG. 3 is a diagram illustrating an example of address book data.

For example, address book index numbers as data numbers (identification information) of the address book, names, telephone numbers, mail addresses, and LED colors are registered in the address book data. The LED color is selectable by a user's desire from a plurality of colors set by the system.

The power source 21 supplies power to each unit of the information processing terminal device.

The user interface unit 22 may be a sensor, an input key, or the like, and inputs the given command by key operation or the like from a user. Furthermore, if the information processing terminal device according to an embodiment is a foldable mobile phone or a notebook PC, the user interface unit 22 detects whether the device is folded (closed) or unfolded.

The screen display unit 23 is, for example, a Liquid Crystal Display (LCD) and displays various information.

The sound control unit 24 controls sound to be output from a speaker 24a and the like.

The LED 25 has one or a plurality of LED elements and emits a plurality of LED colors. For example, if the information processing terminal device according to an embodiment is a foldable mobile phone or a notebook PC, the LED 25 is provided on a back panel or the like of the device, so that a user may detect the light even if the device is folded (closed).

The modem 26 controls communications. The RF interface unit 27 communicates with external units through an antenna 27a.

The CPU 28 achieves function(s) of the address book control unit 11, the mail control unit 12, the telephone control unit 13, the missed call control unit 14, the state monitoring unit 15, the light order control unit 16, the LED control unit 17, and the like shown in FIG. 1, and controls each unit of the information processing terminal device of FIG. 2.

Description will be made below of the information processing terminal device according to an embodiment.

Figure 4:
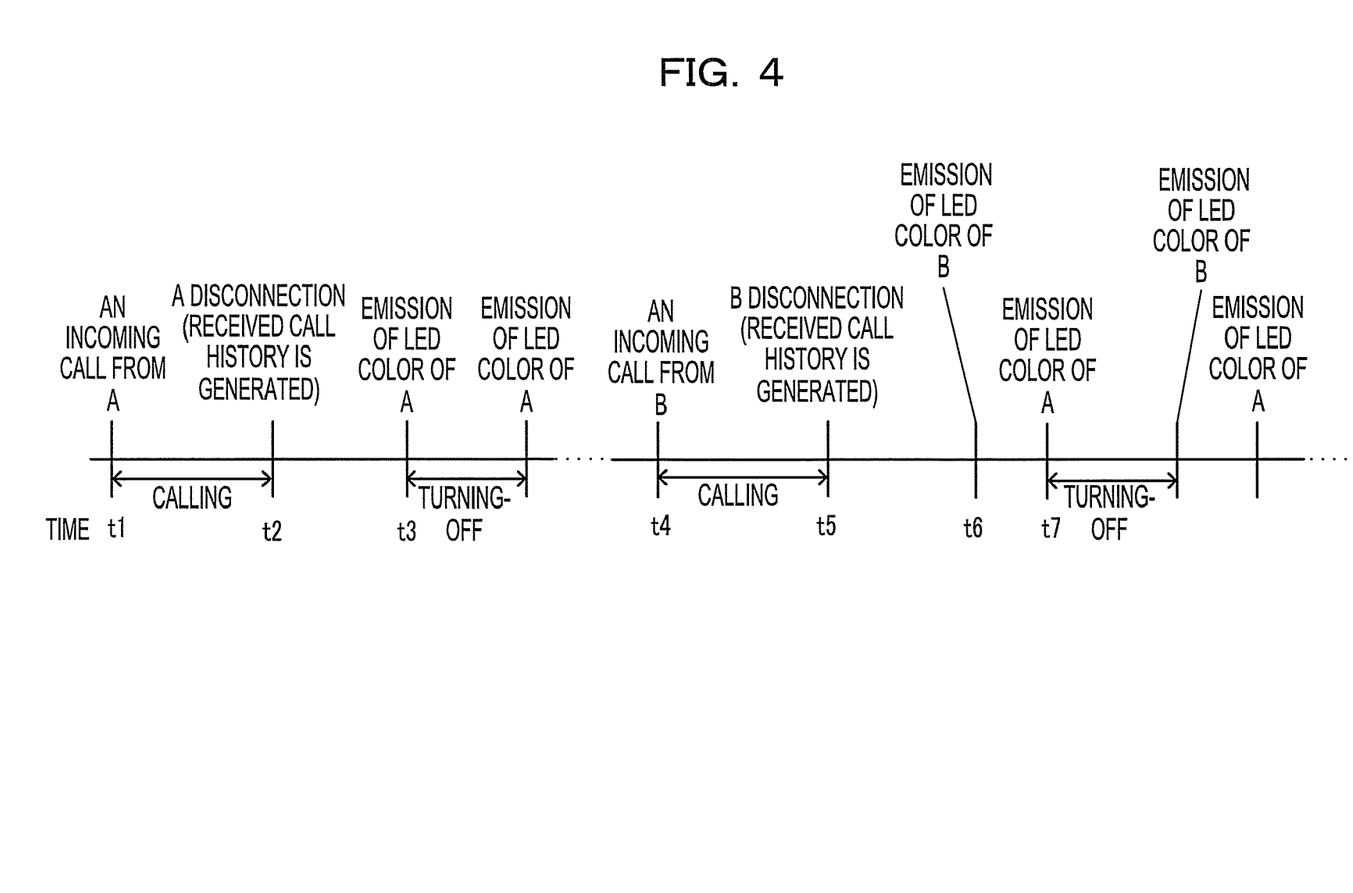
FIG. 4 is a diagram illustrating a lighting pattern of LED in case of an occurrence of a missed call.

FIG. 4 is a diagram illustrating a lighting pattern of LED in case of occurrence of a missed call.

First, when the information processing terminal device receives an incoming call from a caller/sender A registered in the address book shown in FIG. 3 (time t1), the telephone control unit 13 notifies the address book control unit 11 of the telephone number of the caller A of the incoming call, and then obtains an address book index number of the address book data. When calling performed for a certain time period is disconnected (time t2), the missed call control unit 14 obtains an address book index number from the telephone control unit 13, and then generates and stores received call history data based on the address book index number and an arrival time. The received call history data may be stored in the memory 20. The received call history data includes the missed call history data.

Figure 5:
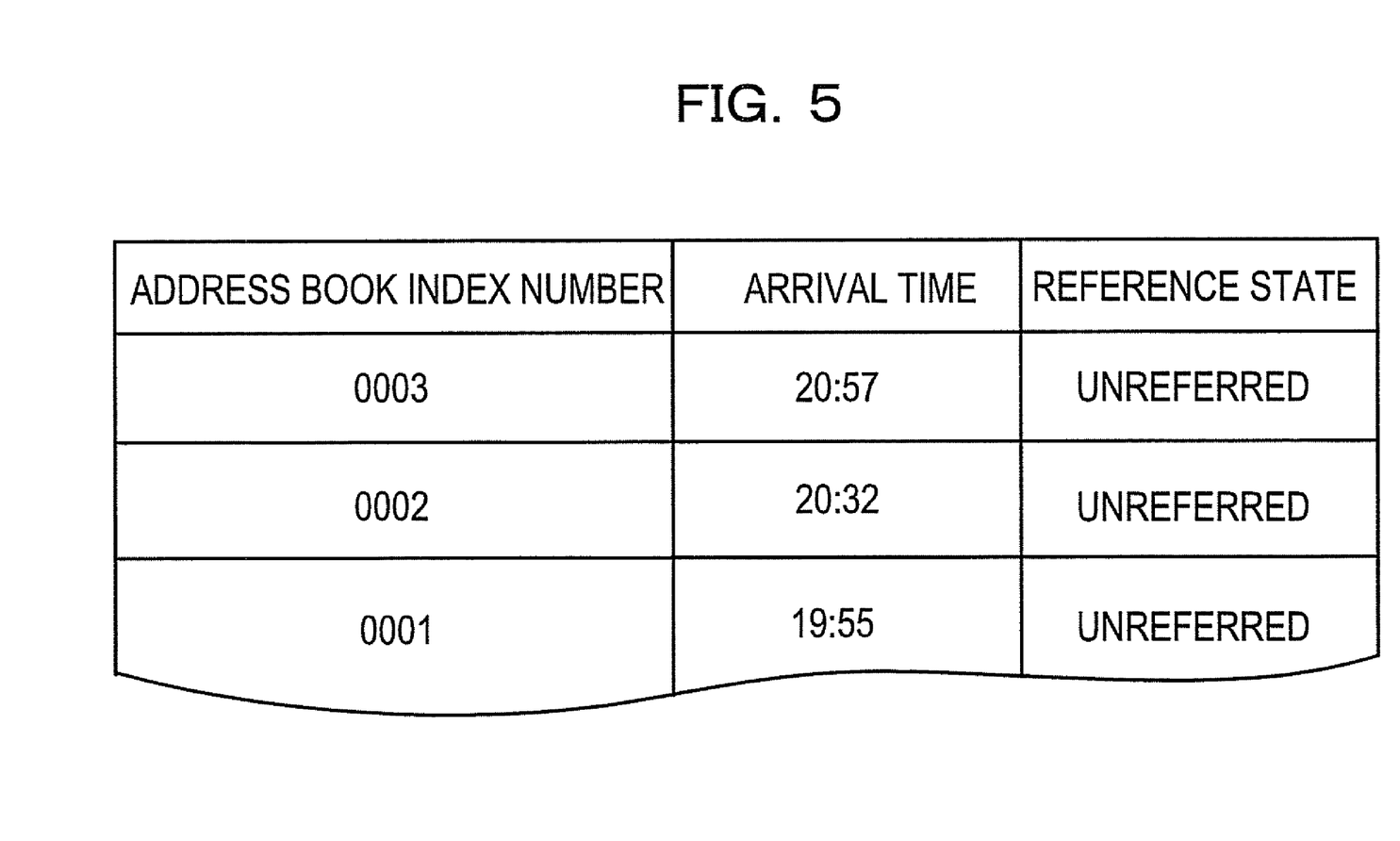
FIG. 5 is a diagram illustrating an example of missed call history data.

FIG. 5 is a diagram illustrating an example of missed call history data.

As shown in FIG. 5, address book index numbers, arrival times, reference states of missed calls are managed in the missed call history data.

In case of occurrence of a missed call, the state monitoring unit 15 informs the light order control unit 16 that a missed call occurs from the telephone control unit 13, obtains the address book index number, and then informs the light order control unit 16. The light order control unit 16 informs the address book control unit 11 of the address book index number, and then inquires and obtains the LED color. After that, the light order control unit 16 instructs the LED control unit 17 to emit the obtained LED color. For example, the LED color of the caller A (pink color in case of setting in FIG. 3) is emitted by the LED 17a after the given time period (for example, 5 to 20 sec.) from disconnection of the incoming call (time t3). The light order control unit 16 then repeats turning-off for the given time period (for example, 5 to 20 sec.) and turning-on of the LED color of the caller A.

Next, in case of occurrence of an incoming call from a caller/sender B registered in the address book (time t4), the telephone control unit 13 obtains the address book index number as well as in the case of occurrence of an incoming call from the caller B. When calling performed for a certain time period is disconnected (time t5), the missed call control unit 14 obtains the address book index number from the telephone control unit 13, and generates and stores missed call history data shown in FIG. 5 based on the address book index number and the arrival (occurrence) time.

After that, the state monitoring unit 15 informs the light order control unit 16 that there is a missed call from the telephone control unit 13. The state monitoring unit 15 obtains the address book index number and informs that the number of missed calls has changed, and then informs the address book index number to the light order control unit 16. The light order control unit 16 informs the address book control unit 11 of the address book index number, and then inquires and obtains the LED color of the caller B. After that, the light order control unit 16 instructs the LED control unit 17 to continuously emit the obtained LED color of the caller B and the already obtained LED color of the caller A. For example, the latest LED color (yellow color in case of setting in FIG. 3) of the caller B is emitted first (time t6), and then the LED color of the caller A is emitted (time t7). After that, the light order control unit 16 instructs the LED control unit to repeat turning-off for the given time period and turning-on of the LED colors of caller B and the caller A.

This allows a user to easily confirm the caller (be notified of the caller information) and a number of missed call(s). Furthermore, a user may easily recognize an incoming call order by determining the light order in accordance with the incoming call order.

During telephone calling, the light order control unit 16 may emit another LED color indicating a calling state or may emit the LED color corresponding to the caller as shown in FIG. 3.

Next, description will be made of operation of the information processing terminal device in case of occurrence of an unread mail.

Figure 6:
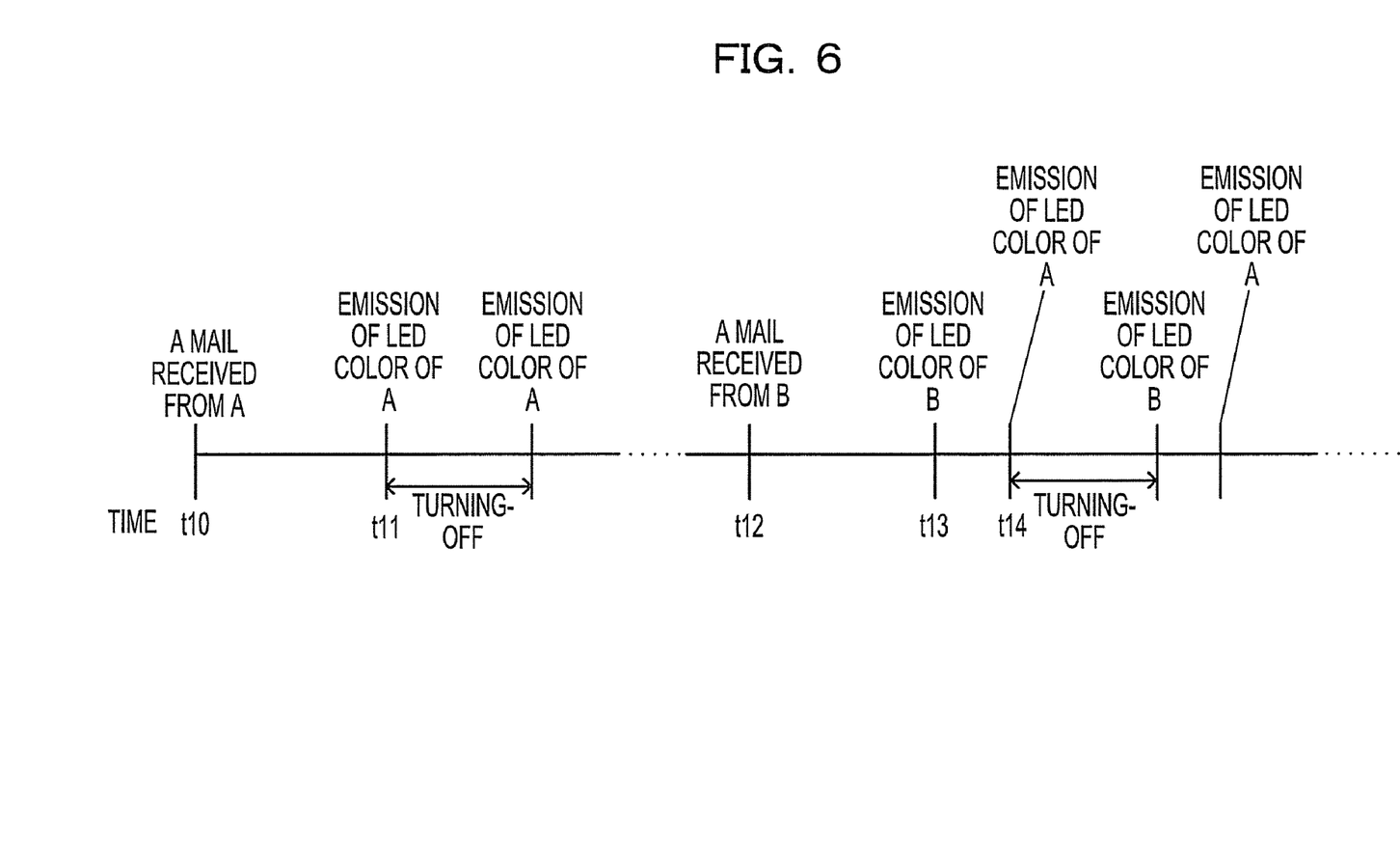
FIG. 6 is a diagram illustrating a lighting pattern of LED in case of an occurrence of an unread mail.

FIG. 6 is a diagram illustrating a lighting pattern of LED in case of occurrence of an unread mail.

First, when a mail is received from the sender A registered in the address book data (time t10), the mail control unit 12 notifies the address book control unit 11 of the mail address of the sender A, and then obtains the address book index number of the address book data. Then the mail control unit 12 generates and stores unread mail reception history data based on the address book index number and the reception time. The unread mail reception history data may be stored in the memory 20. The received call history data includes the unread mail reception history data.

Figure 7:
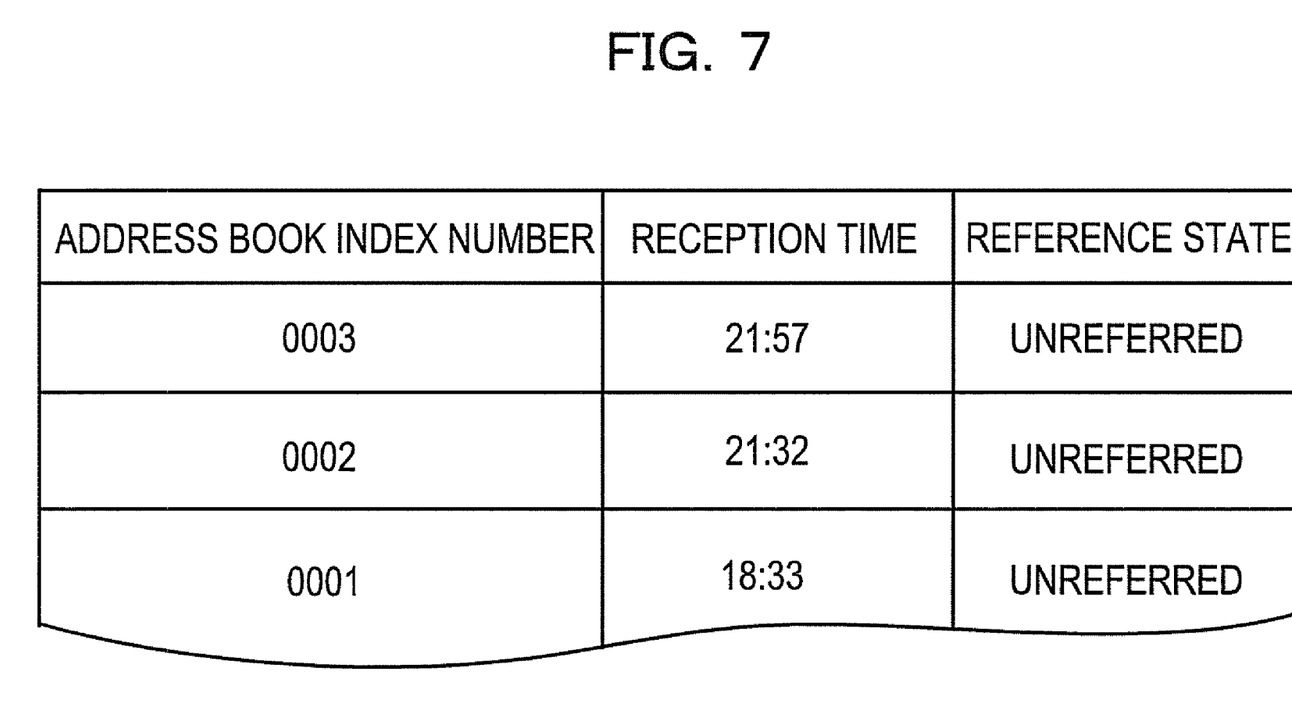
FIG. 7 is a diagram illustrating an example of unread mail history data.

FIG. 7 is a diagram illustrating an example of unread mail reception history data.

As shown in FIG. 7, address book index numbers, reception times, reference states of mails are managed in the unread mail reception history data.

The state monitoring unit 15 informs the light order control unit 16 that an unread mail occurs, and obtains the address book index number and informs the light order control unit 16. The light order control unit 16 informs the address book control unit 11 of the address book index number, and then inquires and obtains the LED color. After that, the light order control unit 16 instructs the LED control unit 17 to emit light in the obtained LED color. For example, after the given time period (for example, five to twenty seconds) from reception of a mail, the light order control unit 16 makes (controls) the LED 17a emit the LED color of the sender A (pink color in case of setting in FIG. 3) (time t11). After that, the light order control unit 16 instructs the LED control unit 17 to repeat turning-off for the given time period (for example, five to twenty seconds) and turning-on of the LED color of the sender A.

Next, when a mail is received from the sender B registered in the address book data (time t12), the mail control unit 12 obtains the address book index number in the same way as the case of receiving the mail from the sender A. After that, the mail control unit 12 generates and stores unread mail reception history data based on the address book index number and the reception time as shown in FIG. 5.

After that, the state monitoring unit 15 informs the light order control unit 16 that the number of unread mails has changed, and then obtains the address index number. The state monitoring unit 15 informs the light order control unit 16. The light order control unit 16 informs the address book control unit 11 of the address book index number, and then inquires and obtains the LED color of the caller B. After that, the light order control unit 16 instructs the LED control unit 17 to continuously emit the obtained LED color of the sender B and the already obtained LED color of the sender A. For example, the latest LED color of the sender B (yellow color in case of setting in FIG. 3) is emitted first (time t13). After that, the LED color of the caller A is emitted (time t14). Then the light order control unit 16 instructs the LED control unit 17 to repeat turning-off for the given time period and turning-on of the LED colors of the sender B and the sender A.

This allows a user to easily confirm or be notified of the sender and a number of the unread mails. Furthermore, the user may easily recognize the reception order by determining the light order in accordance with the reception order.

In fact, a mail reception and an incoming telephone call may exist alternately. Description will be made below of operation of the information processing terminal device in such a case.

Figure 8:
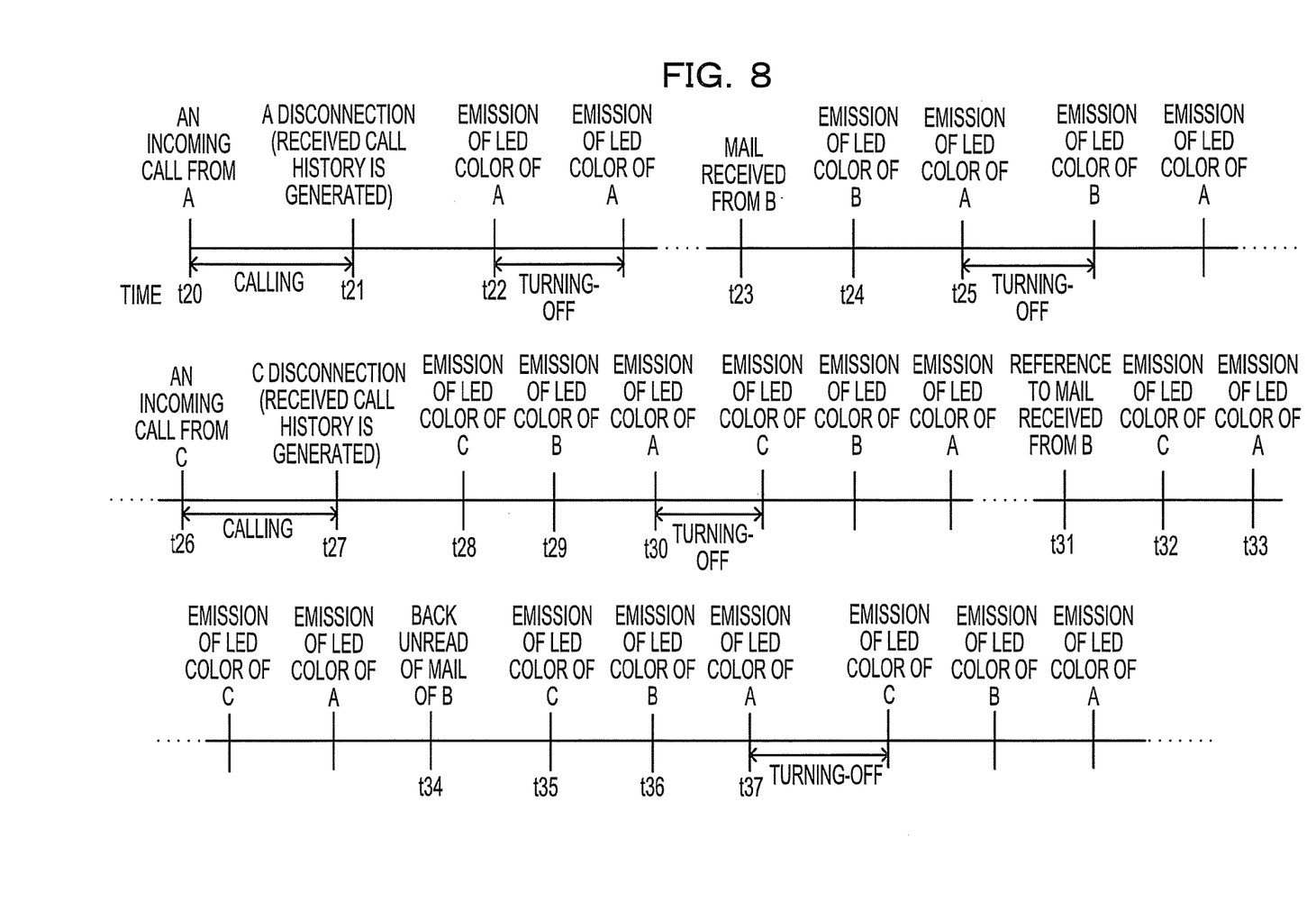
FIG. 8 is a diagram illustrating a lighting pattern of LED in case where missed call(s) and unread mail(s) are mixed.

FIG. 8 is a diagram illustrating a lighting pattern of LED in case where missed call(s) and unread mail(s) are mixed.

First, description will be made of a case where there is a telephone incoming call from the caller A. This operation (times t20 to t22) is the same as that of the times t1 to t3 shown in FIG. 4. After that, when a mail is received from the sender B (time t23), the LED color of the sender B is emitted (time t24), and then the LED color of the sender A is emitted (time t25) in the same way as the operation of the times t12 to t14 of FIG. 6. After that, turning-off for the given time period and turning-on of the LED colors of the sender B and the sender A are repeated.

Next, in occurrence of an incoming call from a caller/sender C registered in the address book data of FIG. 3 (time t26), the telephone control unit 13 obtains the address book index number in the same way as the case where there is an incoming call from the caller A. When calling performed for a certain time period is disconnected (time t27), the missed call control unit 14 obtains the address book index number from the telephone control unit 13, and then generates and stores the missed call history data of FIG. 5 based on the address book index number and the arrival time.

After that, the state monitoring unit 15 informs the light order control unit 16 that a missed call occurs from the telephone control unit 13, and then obtains the address book index number. The state monitoring unit 15 informs the light order control unit 16. The light order control unit 16 informs the address book control unit 11 of the address book index number, and then inquires and obtains the LED color of the caller C. After that, the light order control unit 16 instructs the LED control unit 17 to continuously emit the obtained LED color of the sender C and the already obtained LED color of the sender A. For example, when the LED color is set as in FIG. 3, blue color as the LED color of the sender C is emitted (time t28), and then yellow color as the LED color of the sender B (time t29) is emitted (time t29), and then pink color as the LED color of the sender A is emitted at the end (time t30). After that, the light order control unit 16 repeats turning-off for the given time period and turning-on of the LED colors of the sender C, the sender B, and the sender A.

For example, at a time t31, when a user refers to (accesses) the mail from the sender B, the mail control unit 12 has a reference state of the unread mail reception history data of FIG. 7 as a read state. The state monitoring unit 15 obtains the address book index number of the read mail of the sender B from the mail control unit 12, and then informs the address book index number to the light order control unit 16. As a result, the light order control unit 16 makes (controls) the LED control unit 17 stop emission of the LED color of the sender B and repeat turning-on of the LED color of the sender C (time t32) and the LED color of the sender A (time t33).

When a user wants to set an once referred mail from the sender B to a unread mail as memorandum, and then such input is given to the user interface unit 10, the mail control unit 12 puts reference information of the unread mail reception history data of FIG. 7 back unread (time t34). The state monitoring unit 15 informs the light order control unit 16 of the address book index number of the sender B of the mail that goes back to unread and information of the reception time. At this time, the state monitoring unit 15 informs also the light order control unit 16 of reception times of other unread mails or arrival times of missed calls. Or the state monitoring unit 15 informs the light order control unit 16 at an occurrence of an unread mail or a missed call. As a result, the light order control unit 16 makes the LED control unit 17 emit the LED color of the sender C (time t35), the LED color of the sender B (time t36), and the LED color of the sender A (time t37), in that order. After that, turning-off for the given time period and turning-on of these emissions are repeated.

Information of the reception time may be obtained by referring to the reception history data stored in the memory 20.

Description was made above of the case of referring to the unread mail. The case of referring to the missed call has the almost same operation. In case of a missed call, the missed call control unit 14 changes the reference state of the missed call history data of FIG. 5. Then the state monitoring unit 15 informs the light order control unit 16 of the address book index number corresponding to the referred missed call. Then the light order control unit 16 makes the LED control unit 17 stop emission of the LED color of the sender of the referred missed call.

As described above, even when missed calls and unread mails are mixed, a user may recognize the sender, the number of missed calls and unread mails, and the incoming call order or reception order by the lighting pattern from a single LED 25.

For the address book data of FIG. 3, the LED colors for mail reception and for telephone call incoming may be set separately, so that the number of missed call(s) and the number of unread mail(s) may be recognized individually.

When there is an unread mail or a missed call, a single LED 25 may be shared for emitting light during telephone call incoming or mail reception. However, the LED 25 also may be provided separately.

Figure 9:
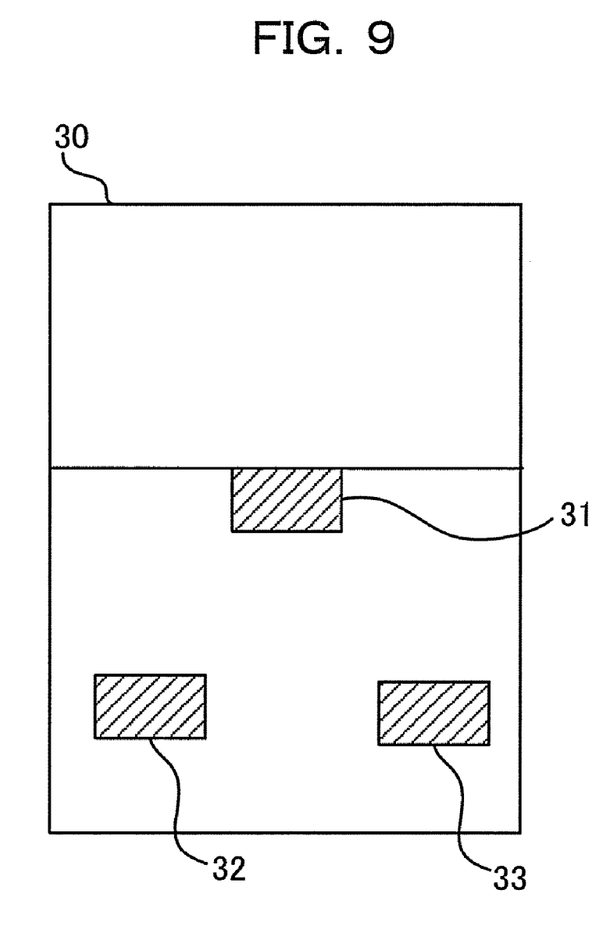
FIG. 9 is a diagram illustrating an example of a back panel of a mobile phone.

FIG. 9 is a diagram illustrating an example of a back panel of a mobile phone.

For example, a mobile phone may include a back panel 30 with an LED 32 for unread mails and an LED 33 for missed calls as well as an LED 31 that emits light at the time of telephone call incoming or mail reception. This allows a user to easily recognize the sender, the number of unread mails and missed call(s), and the incoming and reception order for unread mails and missed calls individually.

The above-described embodiment describes the case of occurrence of missed call(s) or unread mail(s) from different senders. However, it is apparent that the embodiment is applicable to a case of successive occurrence of missed call(s) and/or unread mail(s) by the same caller/sender. In this case, for example, the same LED color may be emitted continuously, or a given interval may be provided for emission to present breaks.

Furthermore, the turning-on time, the turning-off time, and the lighting pattern may be changed if necessary. For example, priority in accordance with the number of incoming calls or the number of mail transmission and reception times is set, and then the light is emitted only when there is a missed call or an unread mail from a caller/sender with high priority. When there is a missed call or an unread mail from a caller/sender with high priority, the LED color corresponding to the sender may be emitted first.

Furthermore, the LED color corresponding to the caller/sender of the latest missed call or unread mail may be emitted in the end.

The turning-on time and the turning-off time may be determined in consideration of power consumption.

A given color (for example, white color) set by the system may be emitted when there is an incoming call by a telephone number or a mail reception by a mail address that is not registered in the address book data, or if the telephone number is not indicated.

To prevent others from presuming the sender/caller or the number of unread mails or missed calls, a lighting pattern of a given combination of LED colors may be emitted before or after emitting the LED color of unread mail or missed call. For example, a rainbow (multiple) colors may be emitted before or after the emission of the LED color of unread mail or missed call.

Figure 10:
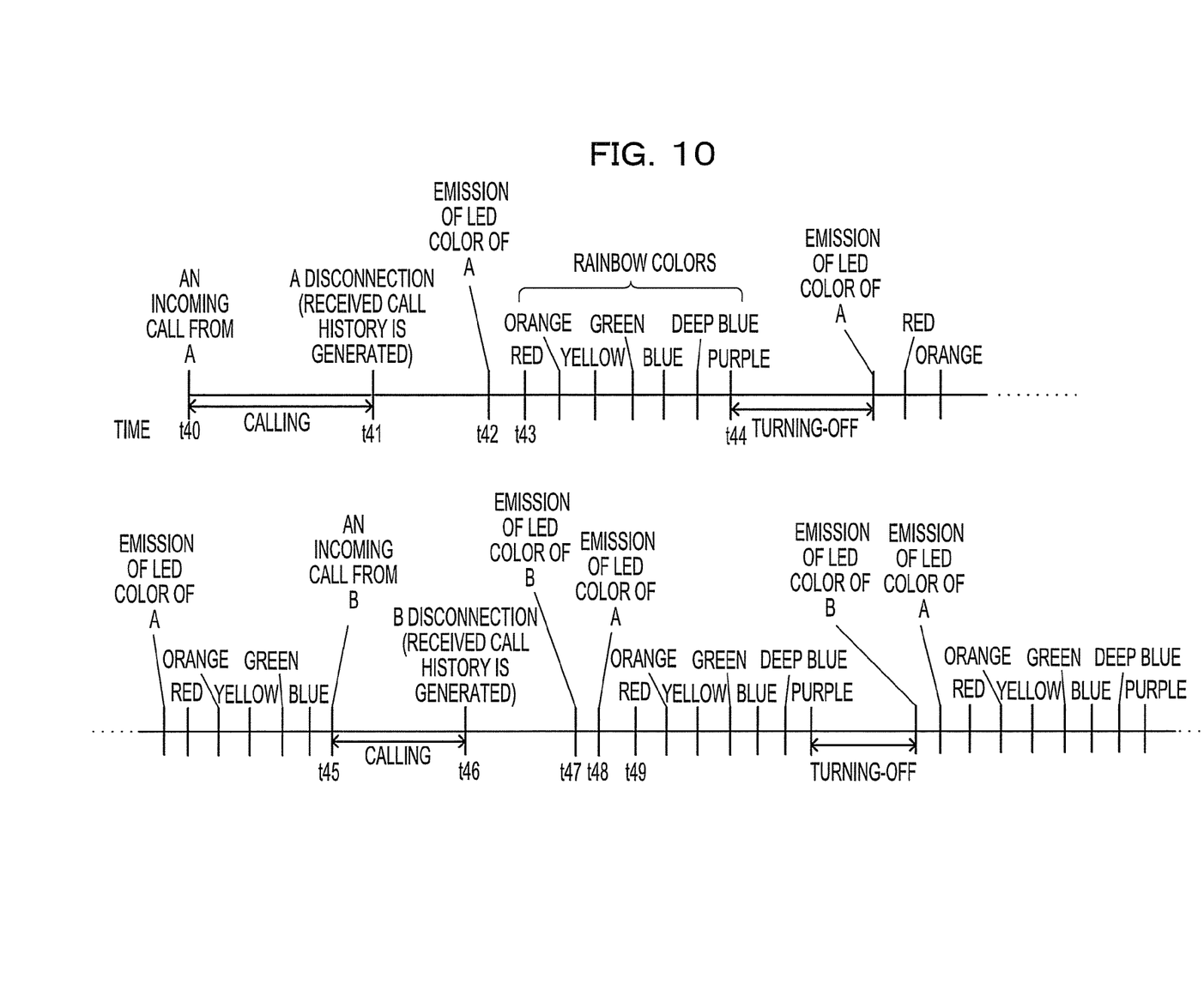
FIG. 10 is a diagram illustrating a lighting pattern of LED in case of using a rainbow (multiple) colors.

FIG. 10 is a diagram illustrating an LED lighting pattern in case of using a rainbow (multiple) colors.

First, when there is an incoming call from the caller A (time t40), received call history is generated (time t41). Then the LED color of the caller A is emitted (time t42) after the given time period from disconnection of the incoming call. After the emission of the LED color of the caller A, the light order control unit 16 makes the LED control unit 17 emit the rainbow colors, respectively: red, orange, yellow, green, blue, deep blue, and purple, in that order (time t43 to t44). After that, turning-off for the given period time and turning-on of these emissions are repeated.

For example, when there is an incoming call from the caller B at the time of emission of blue color of the rainbow colors (time t45), the light order control unit 16 makes the LED control unit 17 stop emitting the rainbow colors. Then, after the given time period from disconnection of the incoming call (time t46), the LED color of the caller B is emitted (time t47). Continuously, the LED color of the caller A is emitted (time t48), and then the rainbow colors are emitted (time t49).

As described above, this seems as if the LED 17a has illumination display to others by emitting the LED color pattern of a combination that is not related to the caller/sender of missed calls or unread mails. Accordingly, it makes difficult for others to presume what kind of missed calls or unread mails there are based on the emission of the LED 17a. This may improve privacy protection.

Figure 11:
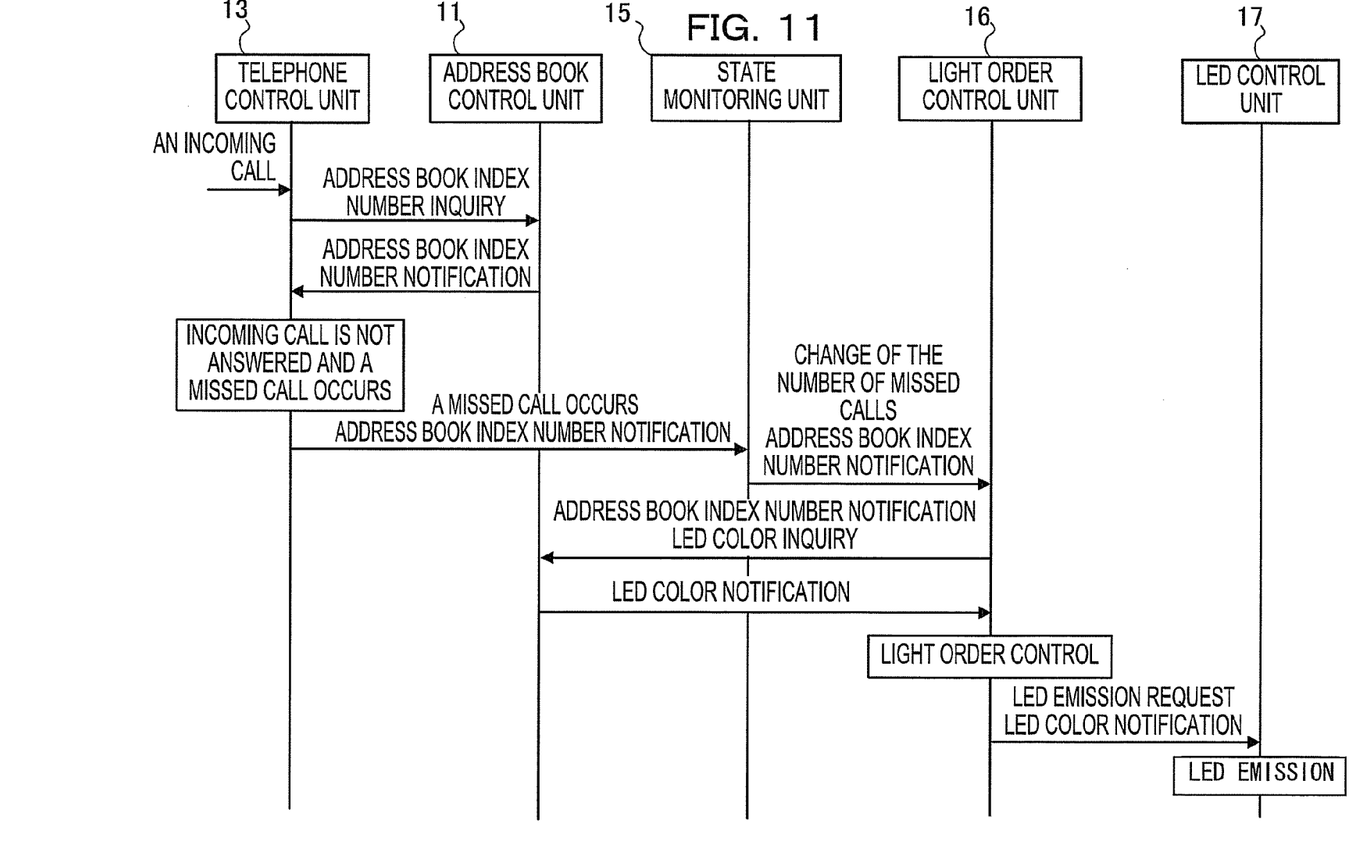
FIG. 11 is a sequence diagram describing turning-on operation of LED in case of an occurrence of a missed call.

FIG. 11 is a sequence diagram describing a turning-on operation of LED in case of occurrence of a missed call.

In occurrence of an incoming call, the telephone control unit 13 inquires an address book index number of the address book control unit 11. The address book control unit 11 notifies the telephone control unit 13 of the address book index number. When a user does not answer the incoming call, and then a missed call occurs, the missed call control unit 14 (not shown in FIG. 11) generates missed call history data shown in FIG. 5. The telephone control unit 13 notifies the state monitoring unit 15 of an occurrence of the missed call and the obtained address book index number. The state monitoring unit 15 notifies the light order control unit 16 of the change of the number of missed calls and the address book index number. The light order control unit 16 notifies the address book control unit 11 of the obtained address book index number, and then inquires an LED color. The address book control unit 11 notifies the light order control unit 16 of the LED color. After that, the light order control unit 16 performs light order control, and then notifies the LED control unit 17 of a request for turning-on the LED and the LED color to be turned on. The LED control unit 17 emits the notified LED color.

Figure 12:
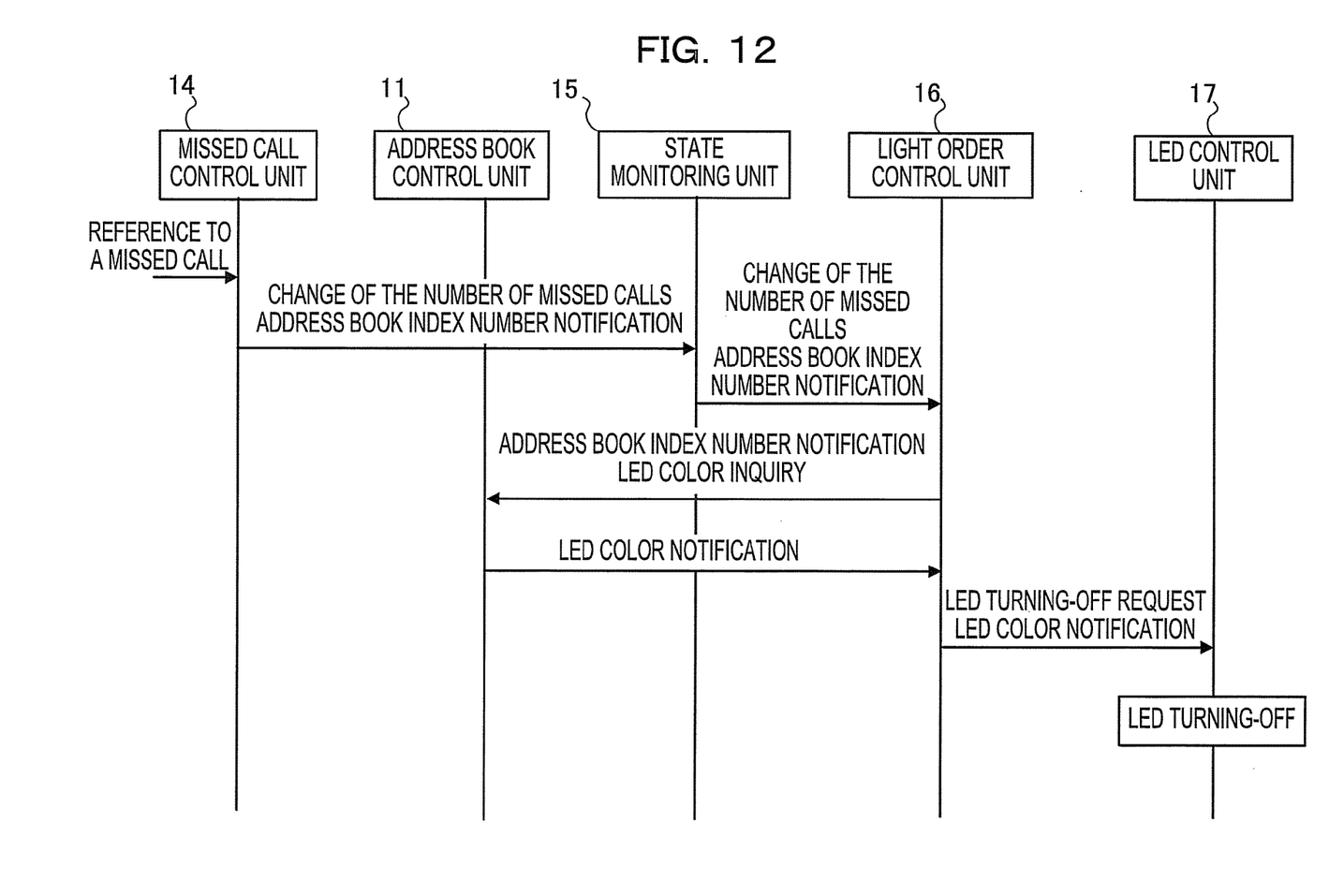
FIG. 12 is a sequence diagram describing turning-off operation of LED at a time of referring to a missed call.

FIG. 12 is a sequence diagram describing a turning-off operation of LED at a time of reference to a missed call.

When a missed call is referred, the missed call control unit 14 notifies the state monitoring unit 15 that the number of missed calls has changed (decreased) and the address book index number. The state monitoring unit 15 notifies the light order control unit 16 of the change of the number of missed calls and the address book index number. The light order control unit 16 notifies the address book control unit 11 of the obtained address book index number, and then inquires an LED color. The address book control unit 11 notifies the light order control unit 16 of the LED color. After that, the light order control unit 16 notifies the LED control unit 17 of a request for turning-off the LED and the LED color to be turned off. The LED control unit 17 turns off the notified LED color.

For operation at the occurrence of a missed call and the reference of an unread mail, the mail control unit 12 performs the same operations as those of the telephone control unit 13 and the missed call control unit 14 shown in FIG. 11 and FIG. 12. Thus, the figures are omitted.

Figure 13:
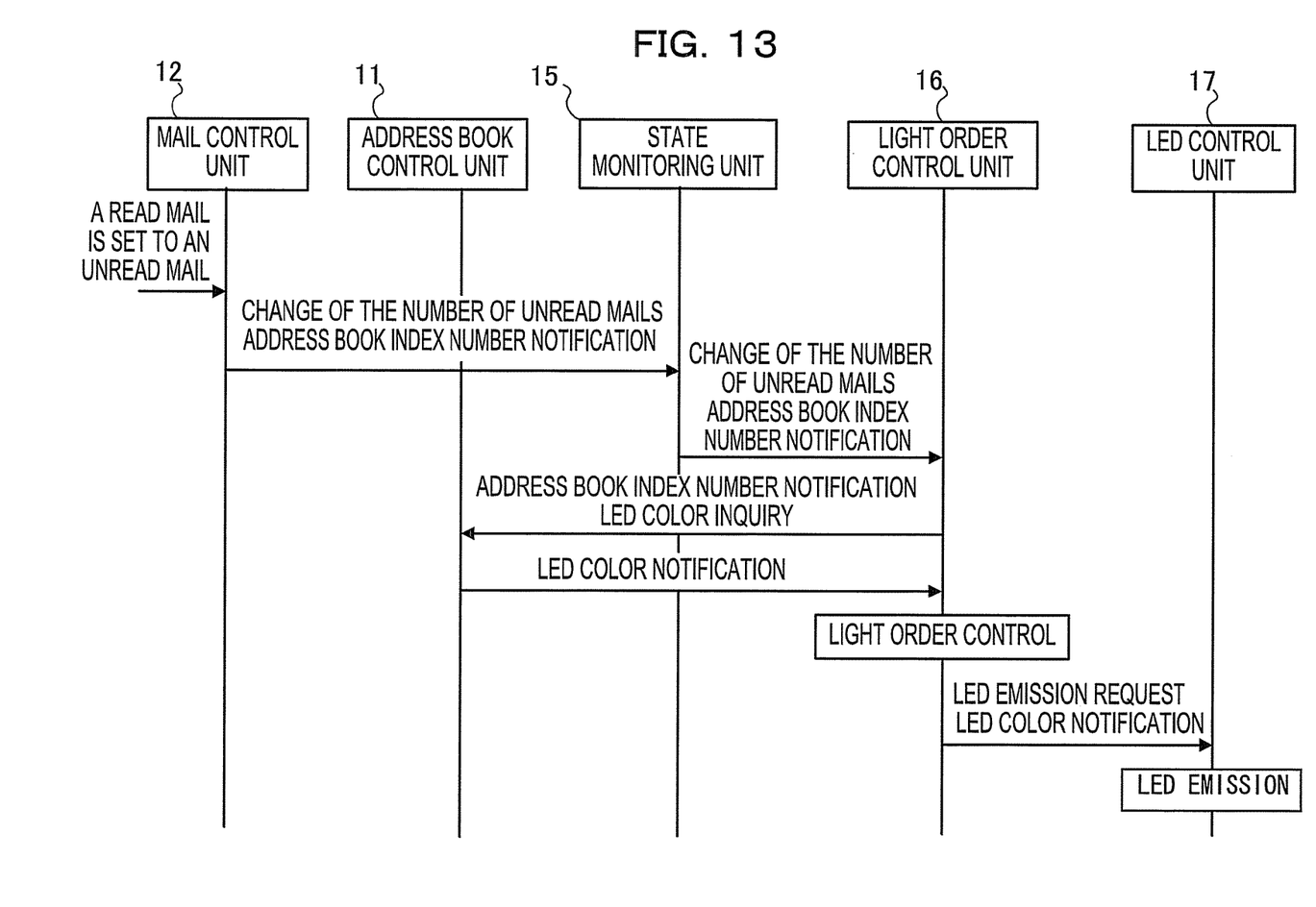
FIG. 13 is a sequence diagram describing turning-on operation of LED at a time of setting an unread mail.

FIG. 13 is a sequence diagram describing a turning-on operation of the LED at a time of setting unread mail.

When a read mail is set to an unread mail, the mail control unit 12 notifies the state monitoring unit 15 that a number of unread mail(s) has changed and the address book index number of the sender of the unread mail. The state monitoring unit 15 notifies the light order control unit 16 of the change of the number of unread mails and the address book index number. The light order control unit 16 notifies the address book control unit 11 of the obtained address book index number, and then inquires an LED color. The address book control unit 11 notifies the light order control unit 16 of the LED color. After that, the light order control unit 16 performs the light order control, and then notifies the LED control unit 17 of a request for turning-on the LED and the LED color to be turned on. The LED control unit 17 emits the notified LED color.

Detailed Description was made above of the information processing terminal device and the method for notifying missed call(s) and unread mail(s) according to an embodiment. However, the present invention is not limited to the above description. For example, description was made of the information processing terminal device by presuming a mobile phone or a notebook PC as the information processing terminal device. However, it is apparent that the present invention is applicable to a Personal Digital Assistant (PDA) provided with a communication function, a desktop PC, or the like.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An information processing terminal device, comprising:
   a state monitoring unit that monitors whether there exists an unread e-mail or a missed call; and
   a light order control unit that makes an emitting unit emit a color corresponding to each sender associated with the unread e-mail or the missed call that is detected, where color information of each sender is associated with a respective order in which the emitting unit emits light.

2. The information processing terminal device according to claim 1, wherein the light order control unit determines a light order of colors according to a receiving order of the unread e-mail or an incoming order of the missed call.

3. The information processing terminal device according to claim 1, wherein the light order control unit repeats emission of the color for each sender while having a turning-off time period for a given time period between the emissions.

4. The information processing terminal device according to claim 1, wherein the light order control unit emits a lighting pattern of colors in a given combination before or after the emission of the color for each sender.

5. The information processing terminal device according to claim 1, wherein the light order control unit stops emission of the color corresponding to the sender who has referred to the unread e-mail or the missed call.

6. The information processing terminal device according to claim 1, wherein the light order control unit performs emission of the color corresponding to the sender of the unread e-mail that is specified to an unreferred state in a light order according to a reception time of the unread e-mail.

7. A method for notifying a missed call or an unread e-mail, comprising:
   monitoring whether there exists an unread e-mail or a missed call; and
   emitting light in colors corresponding to each sender associated with the unread e-mail or the missed call that is detected, where color information of each sender is associated with a respective order in which the light is emitted.

8. A method of providing a notification, comprising:
   associating an identifier of a user registered in an address book with a light indicator; and
   displaying the light indicator when determining that a missed call or an unread mail exists from the user, where color information of each sender is associated with a respective order in which the light indicator is provided.

9. The method of claim 8, comprising:
   changing a color of the light indicator subsequent to determining that information of the missed call has been viewed or the mail is read by a recipient.

* * * * *